(12) United States Patent
Chou et al.

(10) Patent No.: US 7,837,333 B2
(45) Date of Patent: Nov. 23, 2010

(54) PROJECTOR

(75) Inventors: Ming-Chieh Chou, Tainan (TW); Bor-Chen Tsai, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 740 days.

(21) Appl. No.: 11/777,928

(22) Filed: Jul. 13, 2007

(65) Prior Publication Data
US 2008/0174740 A1     Jul. 24, 2008

(30) Foreign Application Priority Data
Jan. 22, 2007     (TW)     ............... 96102288 A

(51) Int. Cl.
*G03B 21/28*     (2006.01)

(52) U.S. Cl. ............... 353/48; 353/50; 353/94; 353/119

(58) Field of Classification Search .......... 353/30, 353/34, 37, 48, 50, 94, 119, 99; 349/8
See application file for complete search history.

(56) References Cited

U.S. PATENT DOCUMENTS

| 3,894,797 | A  | * | 7/1975 | Barowski et al. ............... 353/30 |
| 6,749,308 | B1 |   | 6/2004 | Niendorf et al. |
| 6,945,652 | B2 |   | 9/2005 | Sakata et al. |
| 7,006,274 | B1 |   | 2/2006 | Wittenberg et al. |
| 2008/0074625 | A1 | * | 3/2008 | Lai et al. ....................... 353/82 |

FOREIGN PATENT DOCUMENTS

| CN | 1466375 A | 1/2004 |
| CN | 2727771 Y | 9/2005 |
| CN | 1735172 A | 2/2006 |
| TW | 405044 | 9/2000 |

* cited by examiner

*Primary Examiner*—Kevin Pyo

(57) ABSTRACT

A projector projecting several images simultaneously is provided. The projector includes a main body having a first opening and a second opening, and an optical system disposed in the main body and projecting a first image through the first opening and a second image through the second opening. The optical system includes a laser source comprising a plurality of mono laser sources, and a first reflector with a first reflective surface and a second reflective surface corresponding to the first opening and the second opening.

19 Claims, 13 Drawing Sheets

PROJECTOR

BACKGROUND OF THE INVENTION

1. Field of the Invention

The invention relates to a projector, and more particularly to a projector projecting a plurality of images simultaneously.

2. Description of the Related Art

As personal electronic devices become increasingly more compact, sharing video files, such as photos, briefs or movies is difficult, due to the lack of keyboards for data input, thus interactive efficiency is hindered. A micro-projection module addresses the described problems. Among various new micro-projection modules, micro-projectors with LED source are the most popular. Micro-projectors with LED source, however, have many drawbacks, for example poor power to light conversion efficiency, high temperature at high brightness, poor heat dissipation and precision lens requirements. Additionally, although micro-projectors are small, the light engine thereof, limits the integration of a micro-projector with a portable electronic device.

BRIEF SUMMARY OF THE INVENTION

The invention provides a projector projecting several images simultaneously. An exemplary embodiment of a projector of the invention comprises a main body with a first opening and a second opening. An optical system disposed in the main body projects a first image and a second image through the first opening and the second opening respectively.

The optical system comprises a laser source and a first reflector. The laser source comprises a plurality of mono laser sources. The first reflector has a first reflective surface and a second reflective surface corresponding to the first opening and the second opening. Laser beams from the laser source reach and are reflected by the first reflective surface and the second reflective surface, projecting the first image and the second image through the first opening and the second opening.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1B:
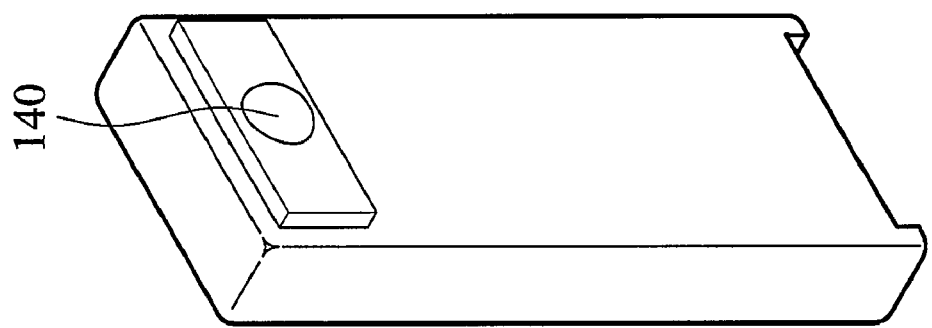
FIGS. 1a and 1b are perspective views of an embodiment of a projector of the invention.
Figure 1A:
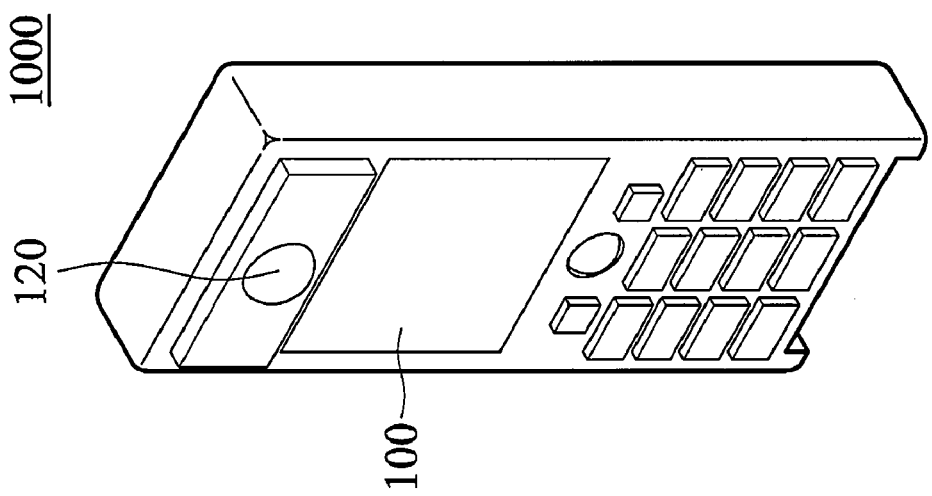

FIGS. 1a and 1b are perspective views of an embodiment of a projector of the invention. Although a mobile phone is described as an example of the projector in FIGS. 1a and 1b, the projector of the invention is not limited thereto. A mobile phone 1000 comprises a main body 100, a first opening 120 and a second opening 140. The first opening 120 is formed at the front of the main body 100, and the second opening 140 is formed at the back of the main body 100. An optical system described in the following paragraphs is disposed in the main body 100 and projects a first image through the first opening 120 and a second image through the second opening 140. The first image can be a virtual keyboard, and the second image can be a static image or video image.

Figure 2A:
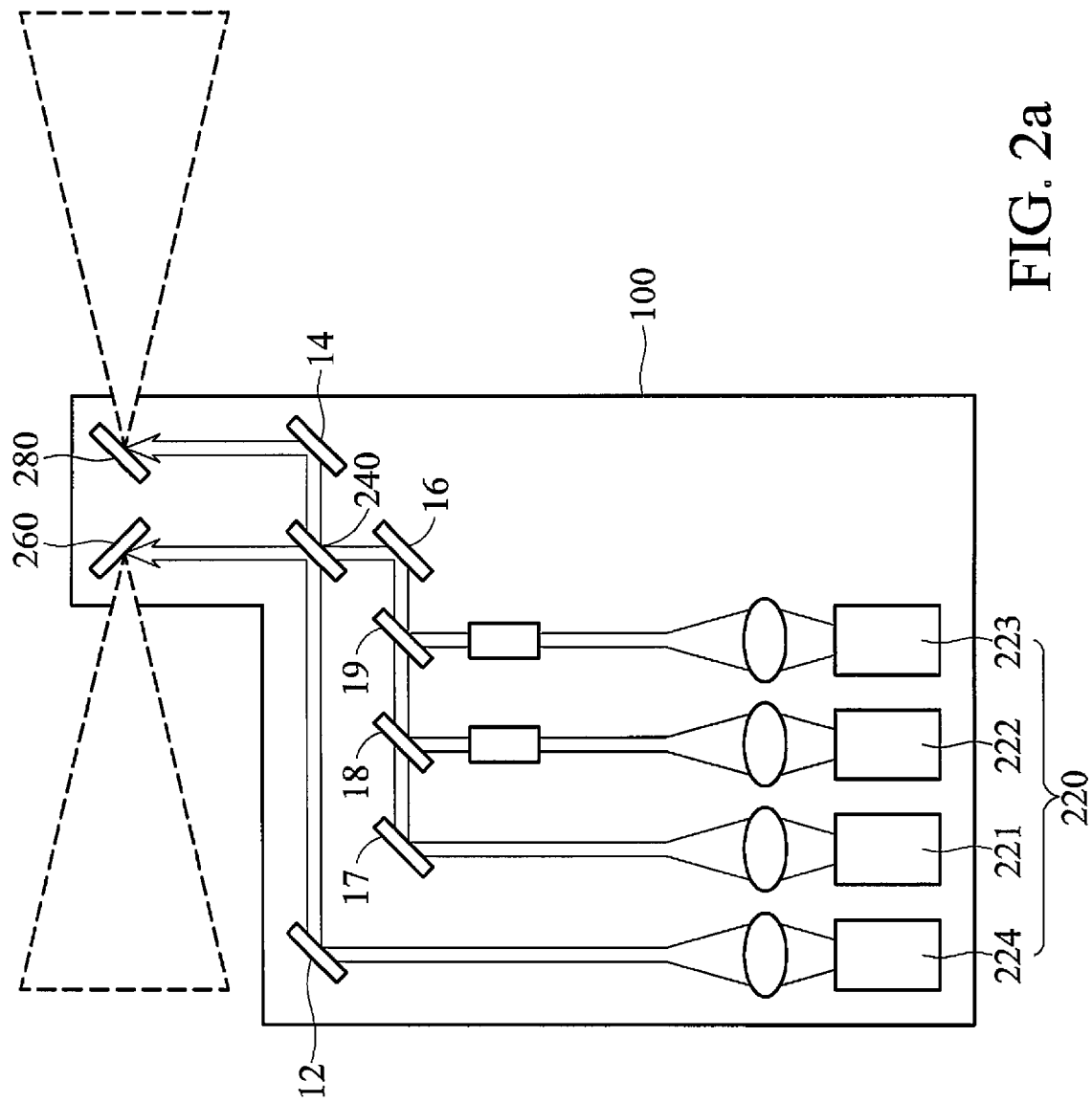
FIG. 2a is a schematic view of an embodiment of an optical system of the projector of the invention.

FIG. 2a depicts an embodiment of an optical system disposed in the main body 100. The optical system 200 comprises a laser source 220, a first reflector 240, a second reflector 260 and a third reflector 280. The laser source 220 comprises a first mono laser source 221, a second mono laser source 222, a third mono laser source 223 and a fourth laser source 224. In this embodiment, the first mono laser source 221 is a red light source, the second mono laser source 222 is a green light source, the third mono laser source 223 is a blue light source, and the fourth mono laser source 224 is a red light source. A laser beam from the fourth mono laser source 224 is reflected by a reflector 12 to the first reflector 240. A laser beam from the first mono laser source 221 is reflected by a reflector 17 to pass through optical lenses 18 and 19 and combined with laser beams from the second mono laser source 222 and the third mono laser source 223 to the first reflector 240 via a reflector 16. The optical lenses 18 and 19 have high pass filtering or low pass filtering ability and combine the laser beams from the mono laser sources to the first reflector 240.

Figure 2B:
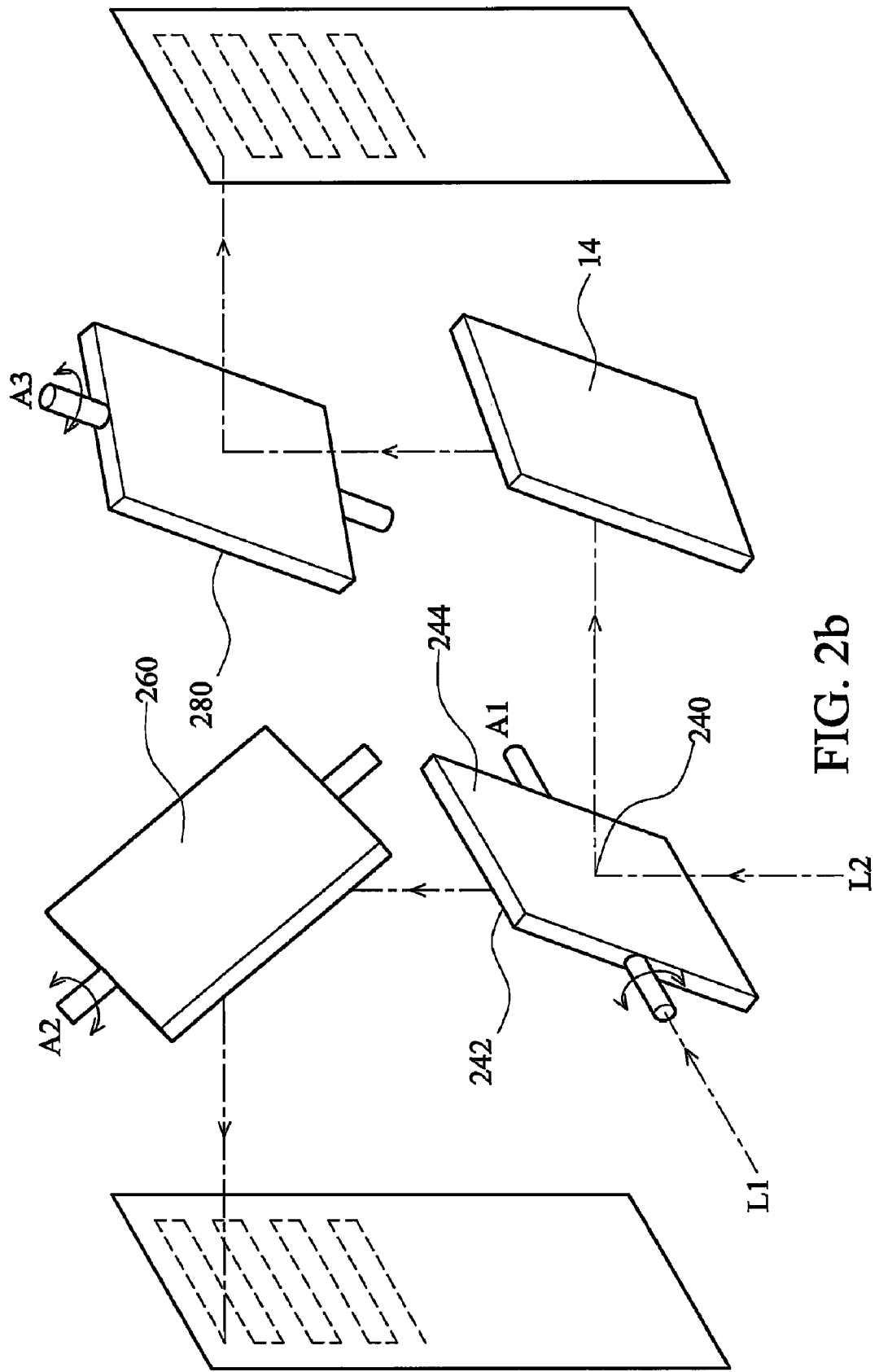
FIG. 2b depicts a first reflector reflecting laser beams.

FIG. 2b depicts the first reflector 240 reflecting laser beams. The first reflector 240 has a first reflective surface 242 and a second reflective surface 244. The laser beam L1 reflected by the reflector 12 reaches the first reflective surface 242. A laser beam L1 is reflected by the first reflective surface 242 to the second reflector 260 and reflected by the second reflector 260 to pass through the first opening 120 to form the first image. A laser beam L2 is reflected by the reflector 17 to second reflective surface 244. Laser beam L2 is then reflected by the reflector 14 to the third reflector 280 to pass through the second opening 140 forming the second image. The second image is a color image formed by the combination of the three mono laser beams.

The first reflector 240 has a first shaft A1, the second reflector 260 has a second shaft A2, and the third reflector 280 has a third shaft A3. The second shaft A2 and the third shaft A3 are perpendicular to the first shaft A1. When the laser beam L1 is reflected by the first reflective surface 242 and the second reflector 260 to a screen, the second reflector 260 swings within a predetermined range about the second shaft A2, thus, scans of laser beam L1 traverse the screen. The first reflector 240 swings within another predetermined range about the first shaft A1, thus, the laser beam L1 scans the screen longitudinally. The traverse and longitudinal scan of the laser beam generate the first image, a two-dimensional image. Similarly, the third reflector 280 swings within a predetermined range about the third shaft A3 and the first reflector 240 swings within another predetermined range about the first shaft A1, whereby the laser beam L2 scans a screen transversely and longitudinally to generate the second image.

Figure 3:
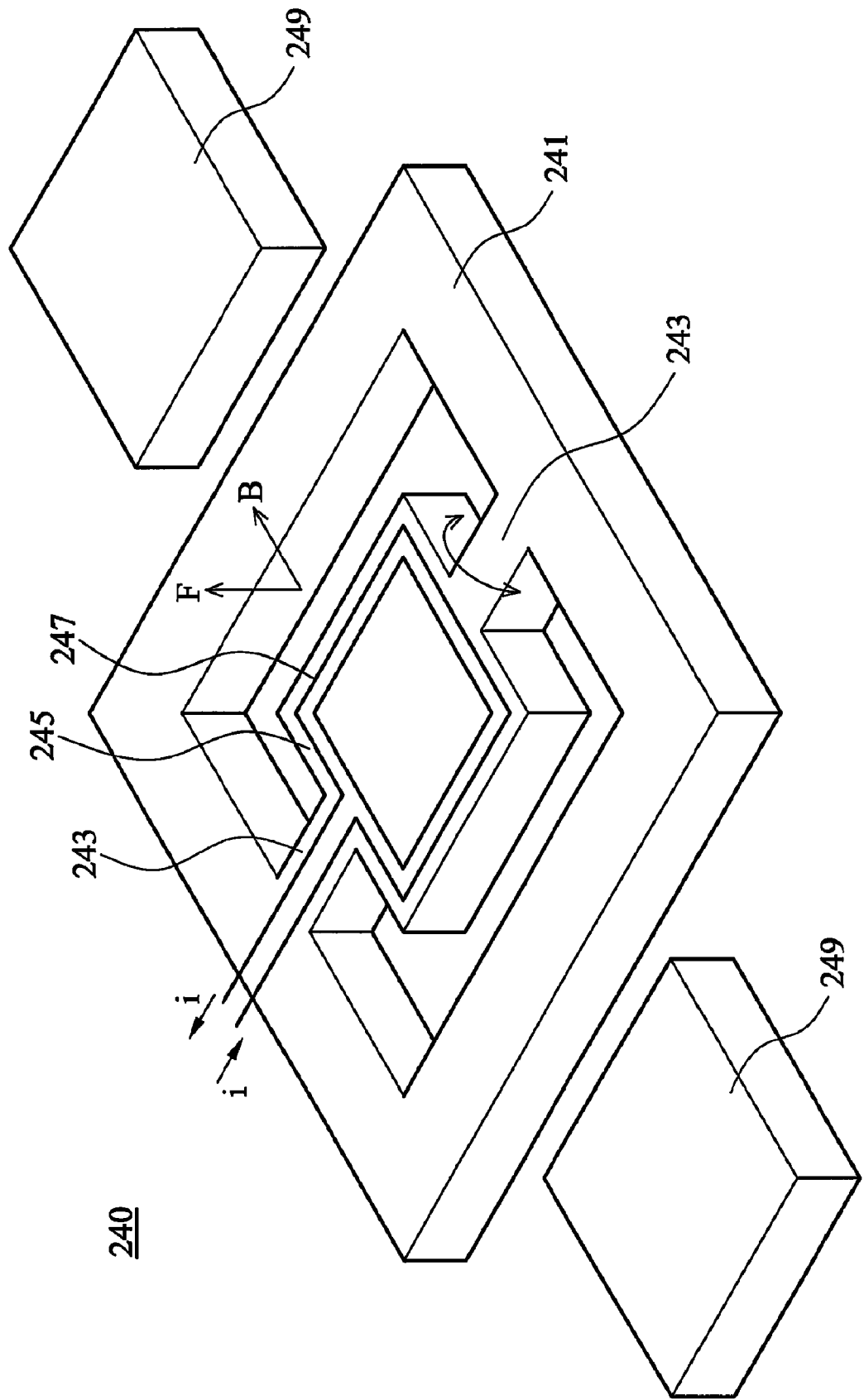
FIG. 3 is a schematic view of the first reflector of the invention.

The first reflector 240 is a mirror with two reflective surfaces as shown in FIG. 3. The first reflector 240 comprises a main body 241, two torsion beams 243 and a substrate 245 connected to two torsion beams 243, a first reflective surface 242, a second reflective surface 244, coils 247 disposed near the edges of the substrate 245 and magnets 249 disposed around the main body 241.

When alternating current enters the coils 247, the electrical field interacts with the magnetic field produced by magnets 249 to generate electromagnetic force. The first reflector 240 is thus rotated by the generated electromagnetic force. When two laser beams reach the first and second reflective surfaces 242, and 244, the first reflector 240 swings rapidly in the horizontal or vertical direction to reflect the laser beams to the second reflector 260 or the third reflector 280 thus generating the two-dimensional image. The material of the substrate 245, such as glass or plastic, is selected according to the swing frequency. The coils 247 are plated on the substrate. A metal layer is attached to the substrate 245 to form the reflective surfaces 242 and 244.

In addition to the electromagnetic type, the first reflector 240 can also be driven by a static electrical mechanism, electrothermal mechanism, piezoelectrical mechanism or memory alloy mechanism.

Figure 4:
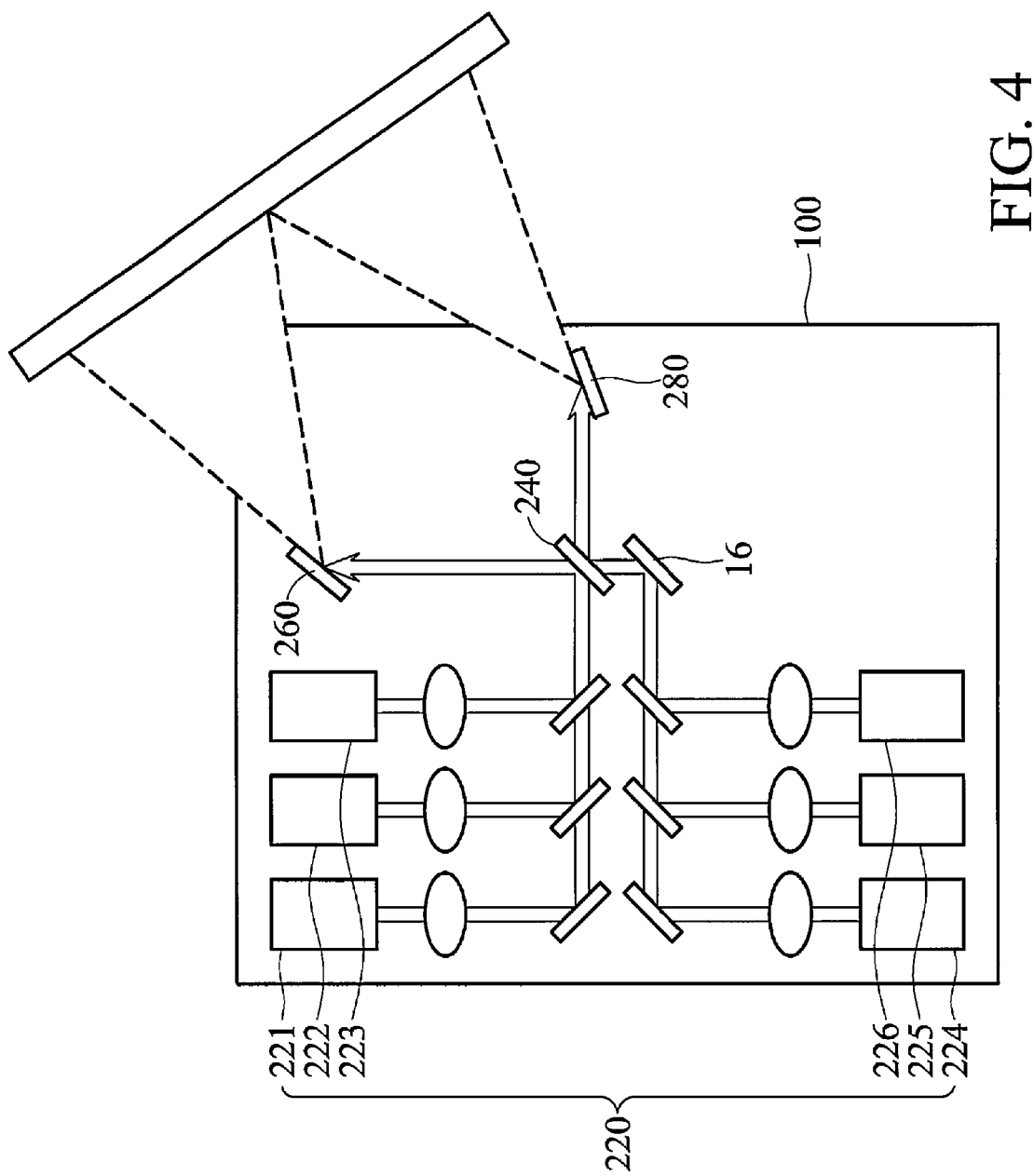
FIG. 4 is a schematic view of another embodiment of the optical system of the invention.

FIG. 4 depicts another embodiment of the optical system 200 of the invention. In this embodiment, the optical system 200 further comprises a fourth mono laser source 224, a fifth mono laser source 225 and a sixth mono laser source 226, wherein the fourth mono laser source 224 is a red light source, the fifth mono laser source 225 is a green light source, and the sixth mono laser source 226 is a blue light source. The laser beams from the first mono laser source 221, the second mono laser source 222 and the third mono laser source 223 are reflected by the first and second reflectors 240 and 260 to generate the first image. The laser beams from the fourth mono laser source 224, the fifth laser source 225 and the sixth laser source 226 are reflected by the first and third reflectors 240 and 280 to generate the second image. The first and second images are color images formed by the combination of three mono laser beams.

Figure 5:
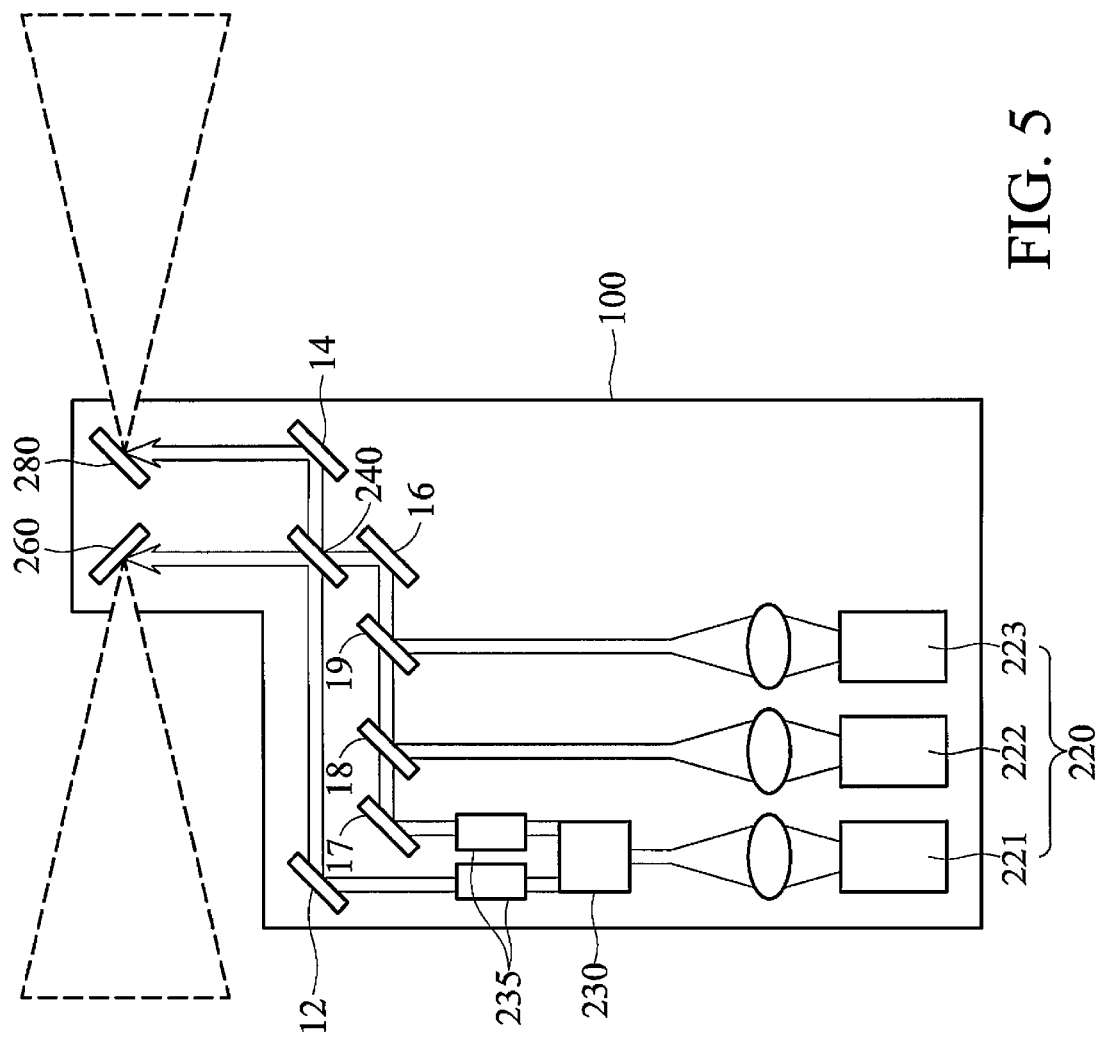
FIG. 5 is a schematic view of another embodiment of the optical system of the invention.

FIG. 5 depicts another embodiment of the optical system 200 of the invention. In this embodiment, the optical system 200 comprises a first mono laser source 221, a second mono laser source 222 and a third mono laser source 223, a splitter 230 and two light regulators 235. The laser beam from the first mono laser source 221 is split into two beams by the splitter 230. One of the laser beams passing through light regulator 235 is reflected by a mirror 12 to the first reflector 240. The other laser beam, passing through the light regulator 235 is reflected by mirror 17 through optical lenses 18 and 19 and combines with the laser beams from the second and third mono laser sources 222 and 223. The combined laser beam is reflected by the mirror 16 to the first reflector 240. Other arrangements are the same as the embodiment of FIG. 2a, thus further description is omitted for brevity.

Figure 6:
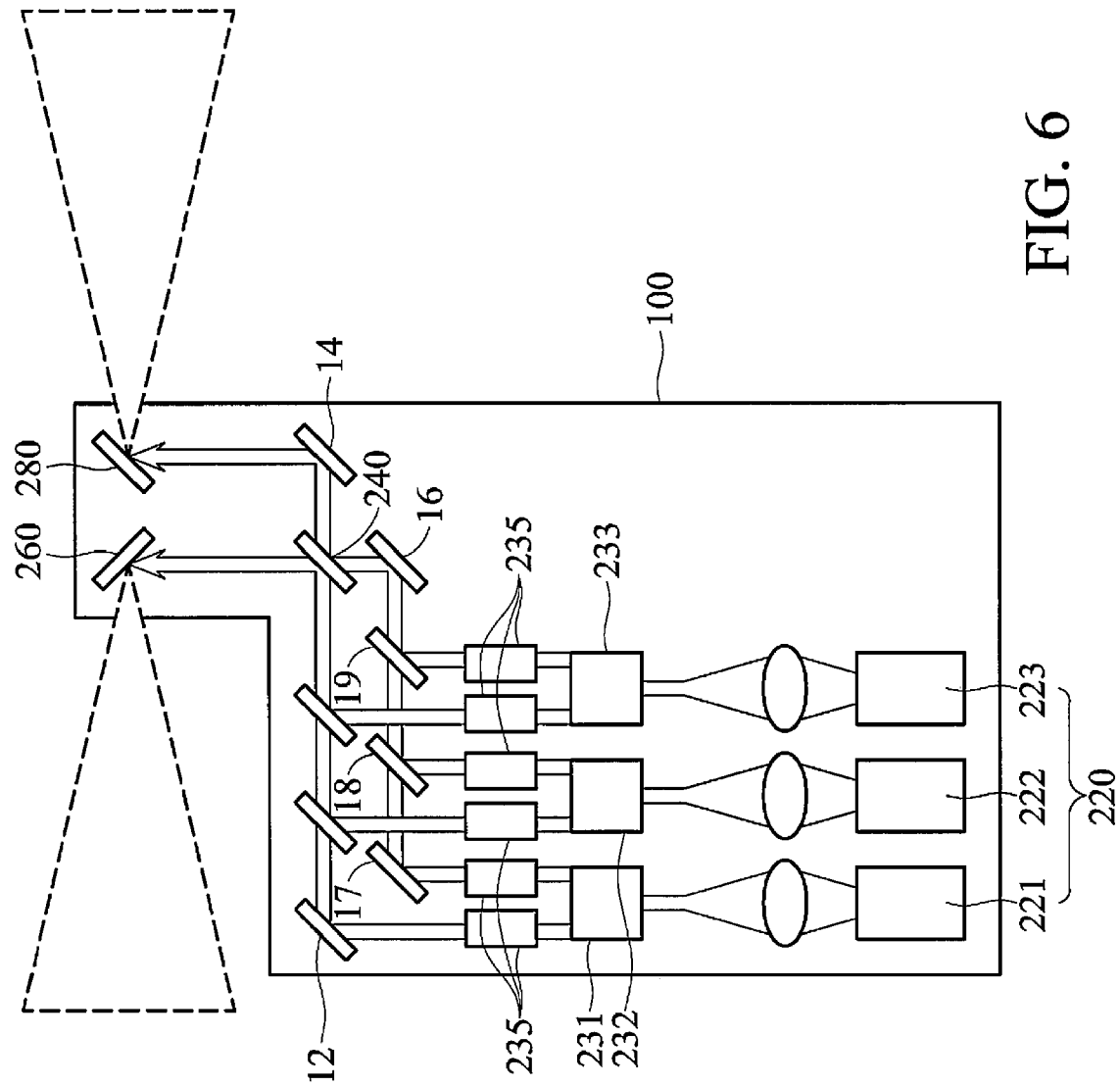
FIG. 6 is a schematic view of another embodiment of the optical system of the invention.

FIG. 6 depicts another embodiment of the optical system 200 of the invention. In this embodiment, three splitters 231, 232 and 233 are disposed in optical system 200 corresponding to the first, second and third mono laser sources 221, 222 and 223. The laser beams from the first, second and third mono laser sources 221, 222 and 223 are split into two laser beams which pass through the light regulators 235 to the first reflective surface 242 and the second reflective surface 244 for generating the first and second images via the second and third reflectors 260 and 280 respectively. In this embodiment, the first image and the second image are color images.

Figure 7:
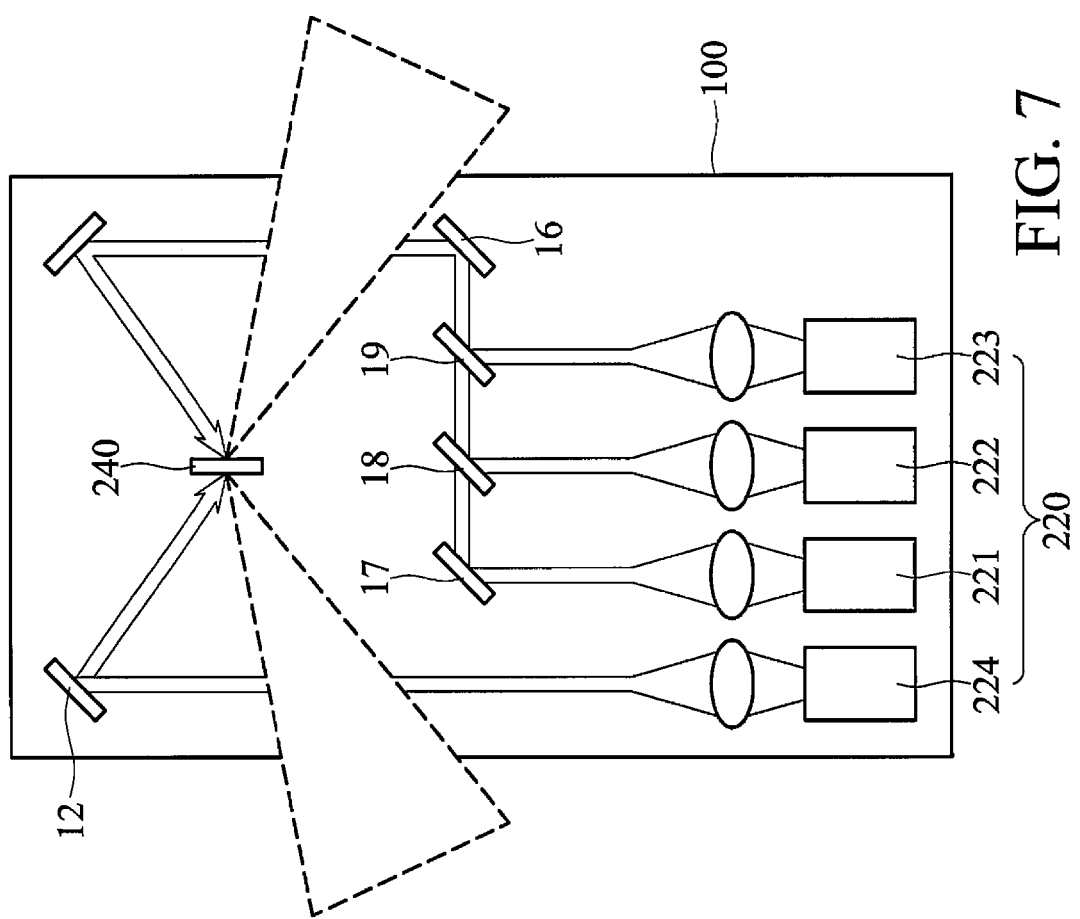
FIG. 7 is a schematic view of another embodiment of the optical system of the invention.
Figure 8A:
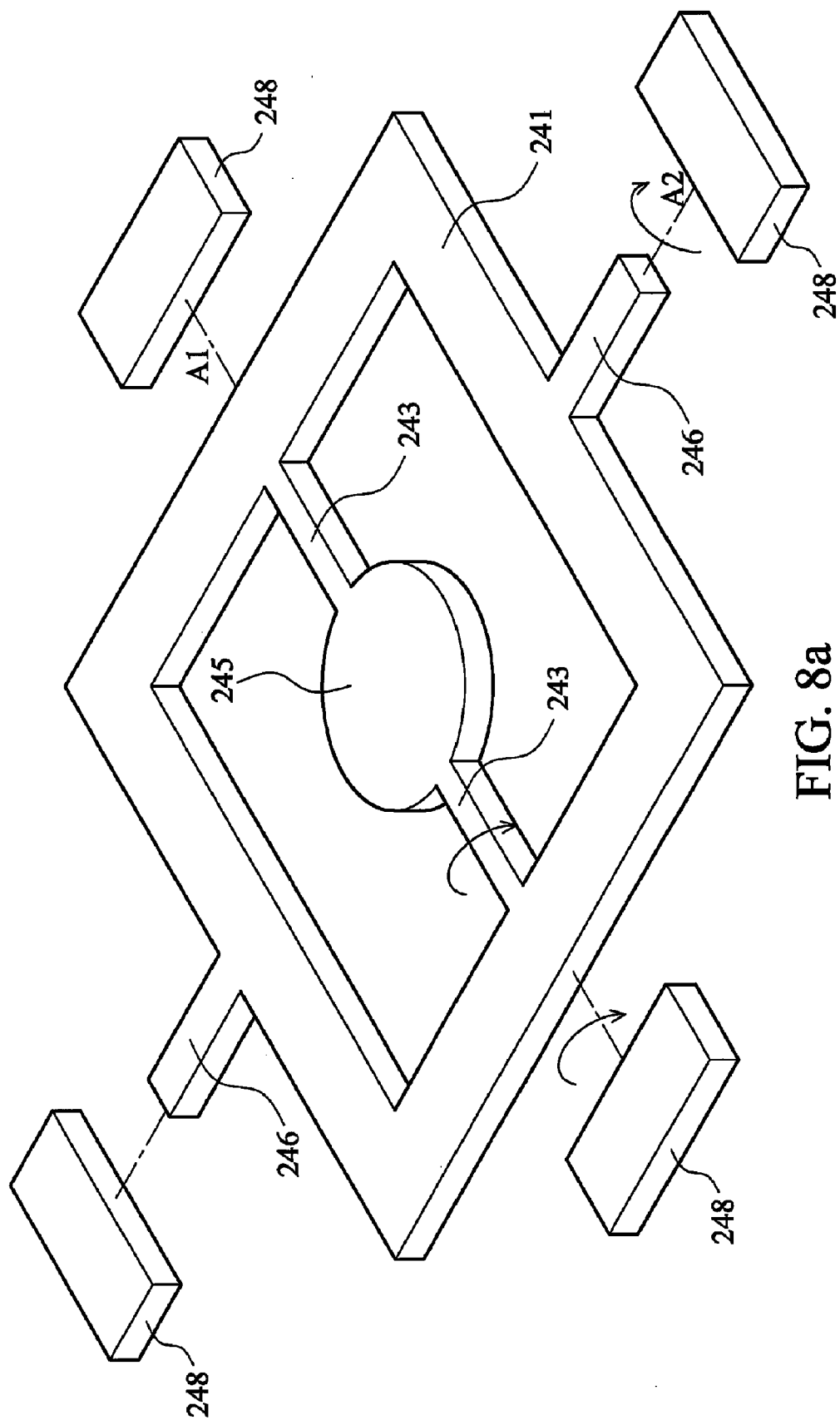
FIG. 8a is a schematic view of another embodiment of the first reflector of the invention.
Figure 8B:
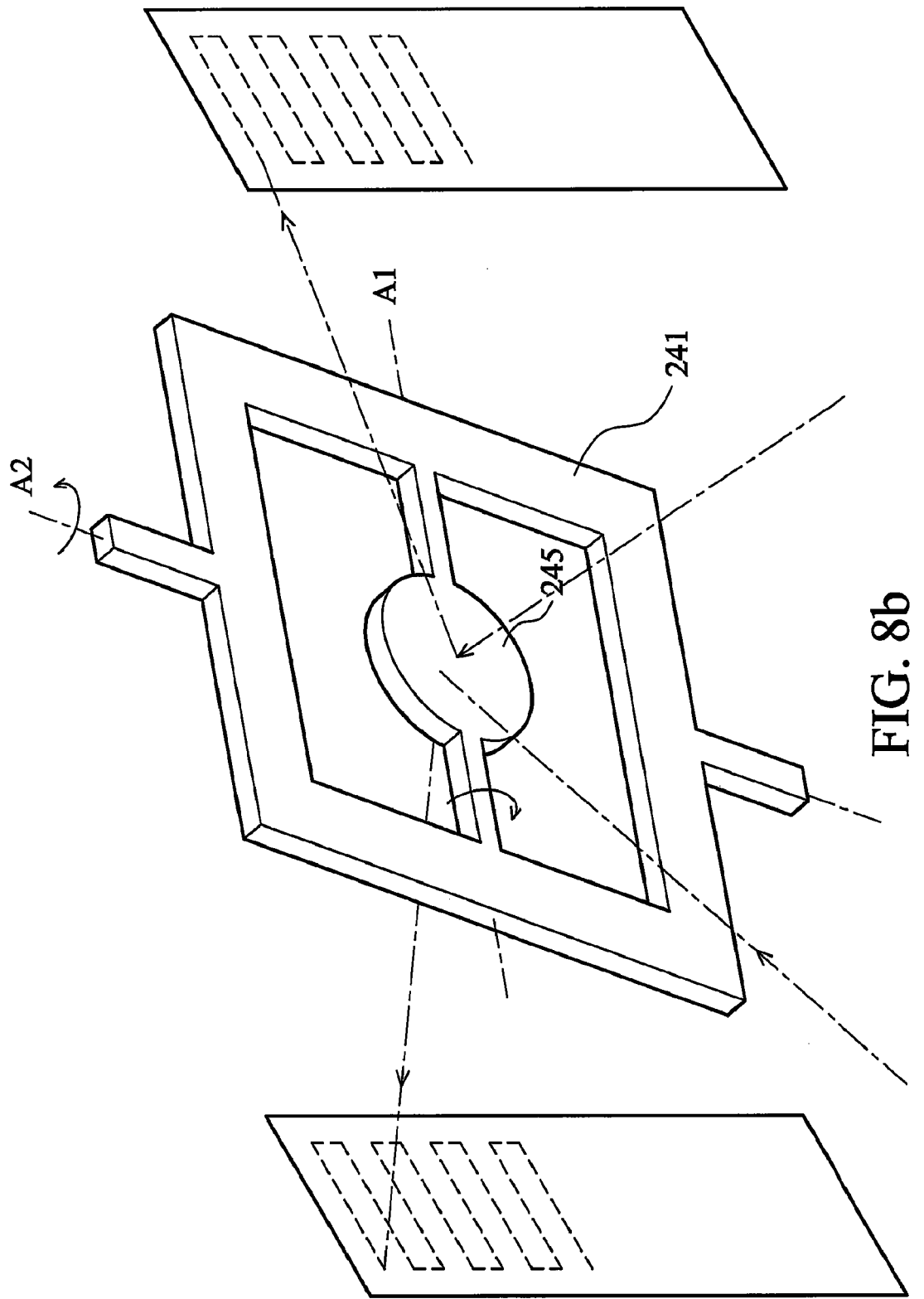
FIG. 8b depicts the first reflector of FIG. 8a reflecting laser beams.

In addition that a two dimensional image is formed by employing two individual reflectors, one reflector with two shafts can be also applied to generate a two dimensional image. FIG. 7 depicts another embodiment another embodiment of the optical system 200 of the invention. Because the first reflector 240 has two shafts, the second and third reflectors 260 and 280 are omitted. FIG. 8a shows the structure of the first reflector 240. The first reflector 240 has a supporting structure 241, two first torsion beams 243, a substrate 245 connecting the torsion beams 243, and two second torsion beams 246. The first torsion beams 243 constitute a first shaft A1 and the second torsion beams 246 constitute a second shaft A2. Coils can be disposed on the supporting structure 241 and the substrate 245, and magnets 248 corresponding to the first torsion beams 243 and the second torsion beams 246 can be disposed around the supporting structure 241. The coils and the magnets 248 rotate the substrate 245 about the first shaft A1 and the second shaft A2. The magnets 248 can be disposed diagonally around the supporting structure 241 to achieve the same effect. FIG. 8b shows the two dimensional first image and the second image generated by the first reflector 240. Compared with the embodiment of FIG. 2b, this embodiment employs only the first reflector 240 to generate the first and second image simultaneously.

Figure 8C:
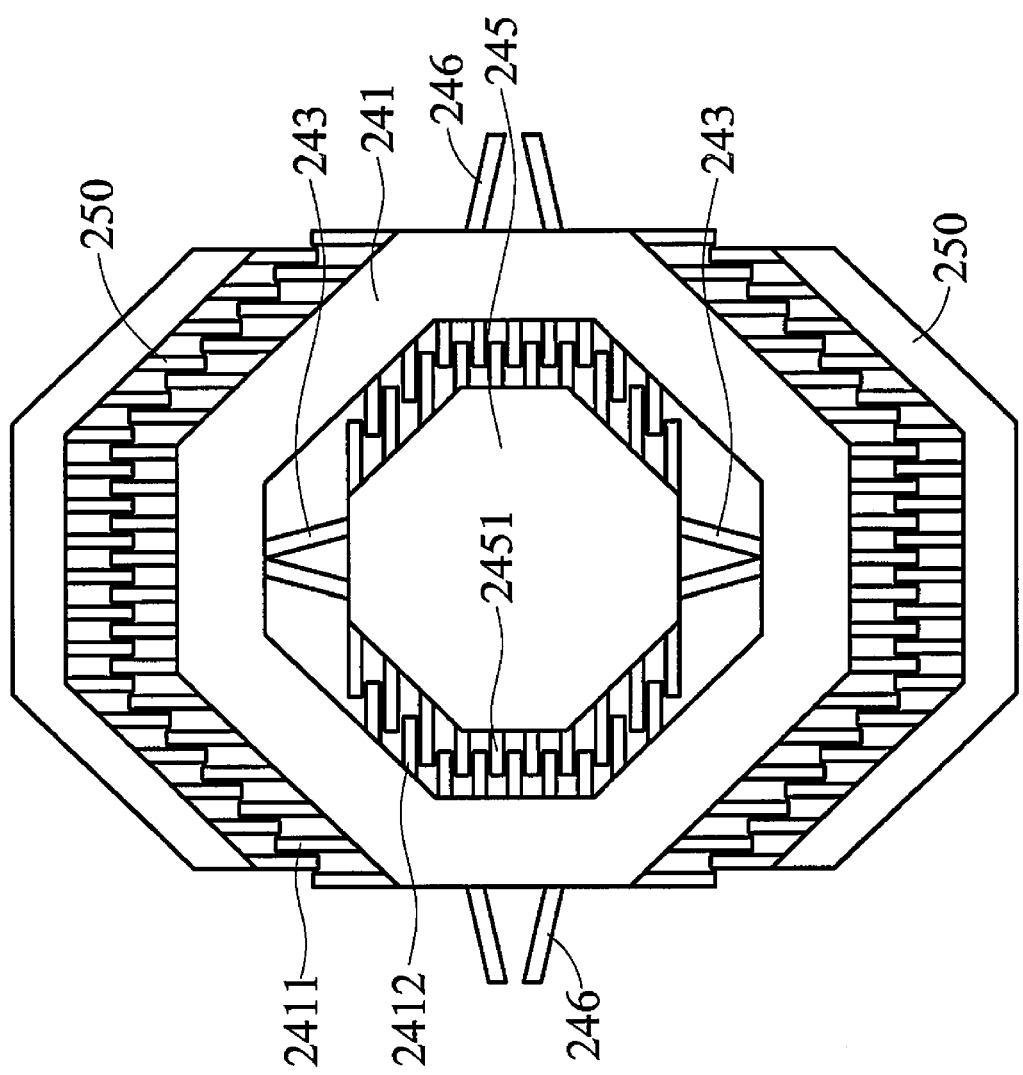
FIG. 8c depicts another embodiment of the first reflector with two shafts.

FIG. 8c depicts another embodiment of the first reflector 240 with two shafts. Comb electrodes 2411 extend from two lateral sides of the supporting structure 2411. Comb electrode 250 corresponding to the comb electrode 2411 is disposed near the outer side of the supporting structure 2411. Comb electrode 2412 extends from the inner side of the supporting structure 2411. Comb electrode 2451 corresponding to the comb electrode 2412 extends from the substrate 245. When the electrical potential of comb electrode 2411 is different from comb electrode 250, the supporting structure 241 rotates about the second torsion beams 246 jointed to a supporting body (not shown). When the electrical potential of comb electrode 2412 is different from the comb electrode 2451, the substrate 245 rotates about the first torsion beam 243 to generate two images in the same way as the first reflector of FIG. 8a.

Figure 9B:
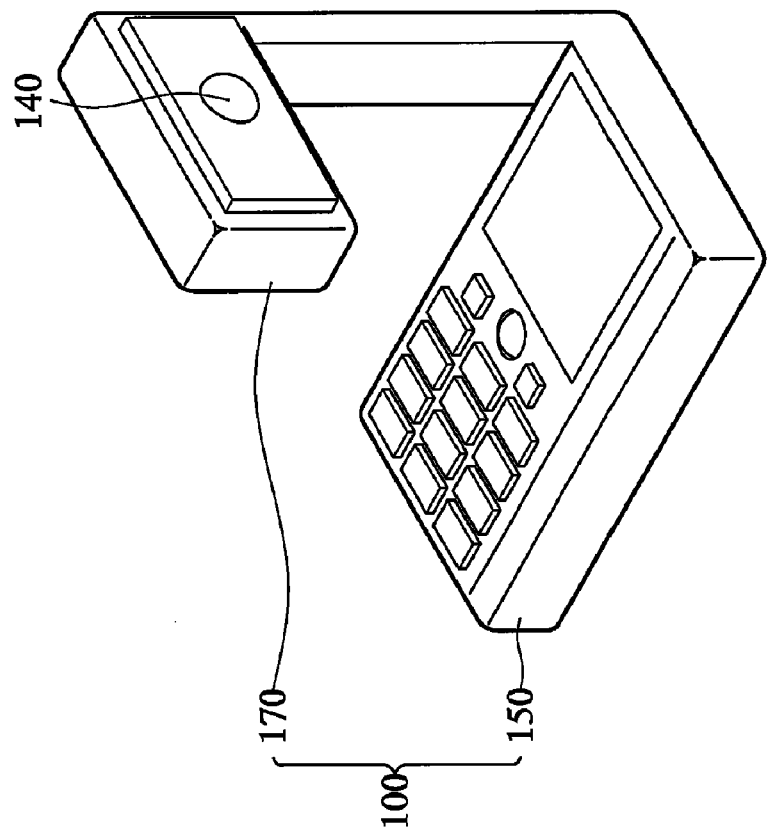
FIGS. 9a and 9b depict another embodiment of the projector of the invention.
Figure 9A:
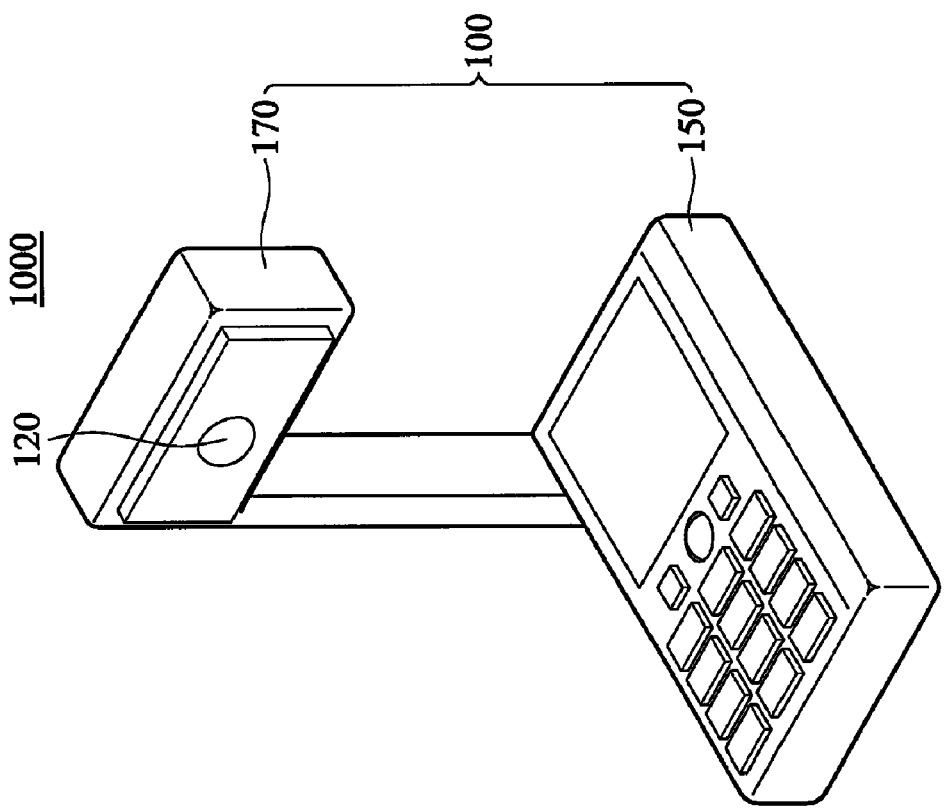

FIGS. 9a and 9b depict another embodiment of the main body 100 of the invention. In FIGS. 9a and 9b, the main body 100 comprises a base 150 and a projecting unit 170. The projecting unit 170 is rotatably joined to the base 150. The first opening 120 and the second opening 140 are formed on the projecting unit 170.

Figure 10:
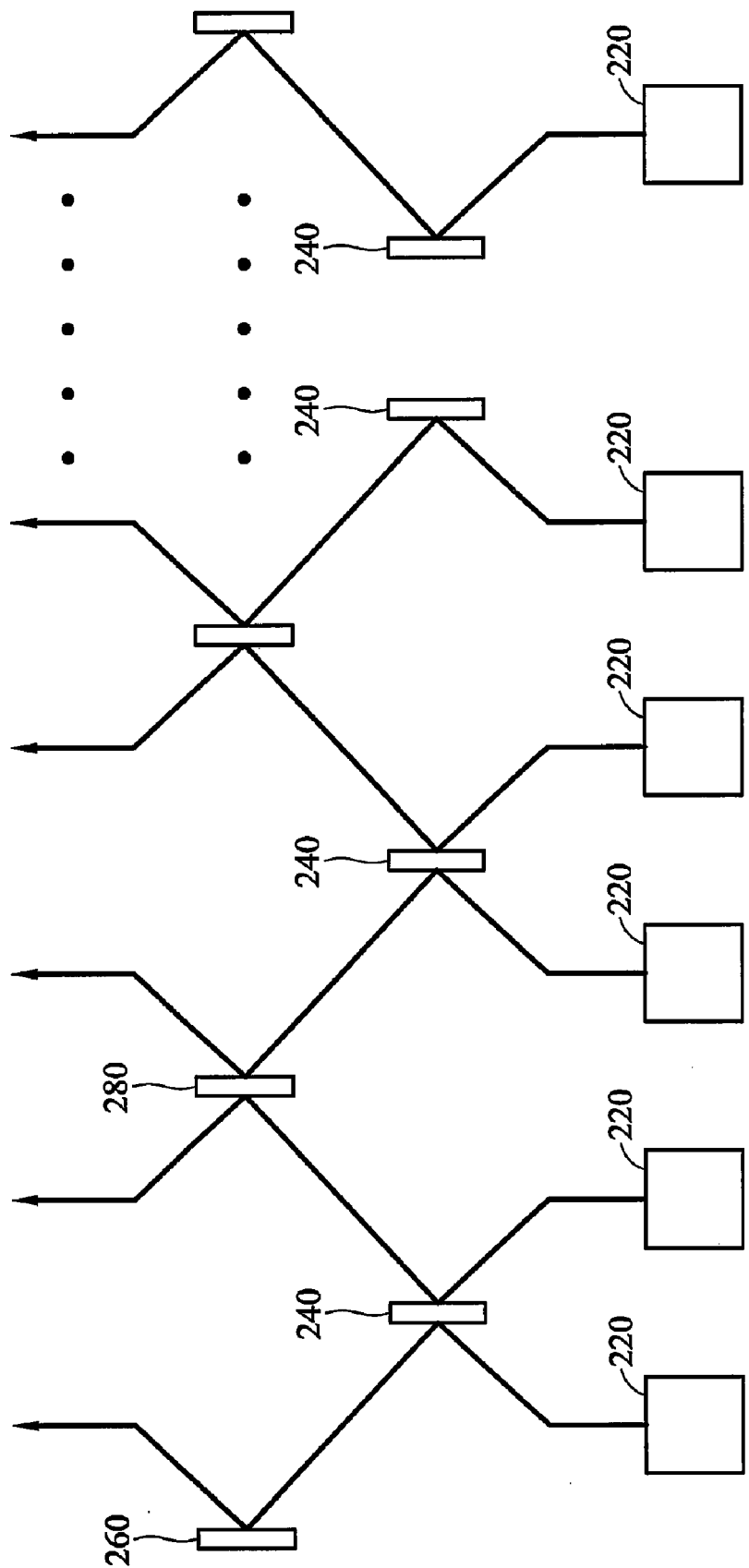
FIG. 10 is a schematic view of a projector projecting several images simultaneously.

In the disclosed embodiments, a projector generating two images is described, the invention is however not limited to this. If multiple images are to be generated, a plurality of reflectors with dual reflective surfaces are employed as shown in FIG. 10. A plurality of laser sources 220, a row of first reflectors 240 and a row of second reflectors 260 are employed to generate multiple images.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projector, comprising:
a main body having a first opening and a second opening;
an optical system disposed in the main body and projecting a first image through the first opening and a second image through the second opening;
wherein the optical system comprises:
a laser source comprising a plurality of mono laser sources; and
a first reflector having a first reflective surface and a second reflective surface corresponding to the first opening and the second opening respectively, wherein laser beams from the laser source reach the first reflective surface and the second reflective surface and are reflected by the first reflective surface and the second reflective surface to project the first image and the second image through the first opening and the second opening.

2. The projector as claimed in claim 1, wherein the laser source comprises a first mono laser source, a second mono laser source and a third mono laser source.

3. The projector as claimed in claim 2, wherein the optical system further comprises a light splitter, and a laser beam from the first mono laser source is split into two laser beams reaching the first and second reflective surfaces respectively, and laser beams from the second and third mono laser sources reach the second reflective surface only.

4. The projector as claimed in claim 2, wherein the optical system further comprises a splitter and a light regulator, and laser beams from the first mono laser source, the second mono laser source and the third mono laser source pass through the light splitter and the light regulator to the first reflective surface and the second reflective surface.

5. The projector as claimed in claim 2, wherein the optical system further comprises a fourth mono laser source, and a laser beam from the fourth mono laser source reaches the first reflective surface and laser beams from the first, second and third mono laser sources reach the second reflective surface.

6. The projector as claimed in claim 5, wherein the first, second, third, and fourth mono laser sources are semiconductor laser sources.

7. The projector as claimed in claim 2, wherein the optical system further comprises a fourth mono laser source, a fifth mono laser source and a sixth mono laser source, and laser beams from the fourth, fifth and sixth mono laser sources reach the first reflective surface, and laser beams from the first, second and third mono laser sources reach the second reflective surface.

8. The projector as claimed in claim 7, wherein the first, second, third, fourth, fifth and sixth mono laser sources are semiconductor laser sources.

9. The projector as claimed in claim 1, wherein the first reflector further comprises a first shaft, and when laser beams from the laser source reach the first reflector, the first reflector rotates within a predetermined range with respect to the first shaft to reflect the laser beams with the first reflective surface and the second reflective surface, thereby generating the first and second images.

10. The projector as claimed in claim 9, wherein the optical system further comprises a second reflector having a second shaft and a third reflector having a third shaft, and the laser beam reflected by the first reflective surface reaches the second reflector rotating about the second shaft within a predetermined range to generate the first image, and the laser beam reflected by the second reflective surface reaches the third reflector rotating about the third shaft within a predetermined range to generate the second image.

11. The projector as claimed in claim 10, wherein the second shaft and the third shaft are perpendicular to the first shaft.

12. The projector as claimed in claim 9, wherein the first reflector further comprises a second shaft, and when laser beams from the laser source reach the first reflector, the first reflector rotates about the first shaft within a predetermined range and subsequently rotates about the second shaft within another predetermined range to generate the first and second images respectively.

13. The projector as claimed in claim 12, wherein the first shaft is perpendicular to the second shaft.

14. The projector as claimed in claim 9, wherein the optical system further comprises a driving device rotating the first reflector with respect to the first shaft in the predetermined range.

15. The projector as claimed in claim 14, wherein the driving device is an electromagnetic, static electrical, electro thermal, piezoelectrical or memory alloy mechanism.

16. The projector as claimed in claim 2, wherein the optical system further comprises a condenser condensing the laser beams from the first, second and third mono laser sources before reaching the first reflector.

17. The projector as claimed in claim 16, wherein the condenser comprises a lens with high pass filtering or low pass filtering ability and allows the light of wavelengths near the ends of the light filtering spectrum of the lens to pass through or be reflected.

18. The projector as claimed in claim 1, wherein the laser source comprises a first mono laser source and a second mono laser source, and a laser beam from the first mono laser source reaches the first reflective surface, and a laser beam from the second mono laser source reaches the second reflective surface.

19. The projector as claimed in claim 1, wherein the main body comprises a base and a projecting unit rotatably disposed on the base, and the first opening and the second opening are formed on the projecting unit.

* * * * *